(12) United States Patent
Won

(10) Patent No.: US 7,885,297 B2
(45) Date of Patent: Feb. 8, 2011

(54) SYNCHRONIZATION DEVICES AND METHODS

(75) Inventor: Chih-Haw Won, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 132 days.

(21) Appl. No.: 12/167,269

(22) Filed: Jul. 3, 2008

(65) Prior Publication Data

US 2010/0002729 A1    Jan. 7, 2010

(51) Int. Cl.
*H04J 3/06* (2006.01)
(52) U.S. Cl. .................................................. 370/509
(58) Field of Classification Search .................. None
See application file for complete search history.

(56) References Cited

U.S. PATENT DOCUMENTS 6,598,172 B1 * 7/2003 VanDeusen et al. ......... 713/503
7,130,316 B2 * 10/2006 Kovacevic .................. 370/509
2004/0184573 A1 * 9/2004 Andersen et al. ............ 375/372

* cited by examiner

*Primary Examiner*—Kwang B Yao
*Assistant Examiner*—Alex Skripnikov
(74) *Attorney, Agent, or Firm*—Thomas, Kayden, Horstemeyer & Risley

(57) ABSTRACT

An exemplary embodiment of a synchronization device is provided. The synchronization device includes a memory, a demultiplexer, a comparator, and a sampling rate converter. The synchronization device has a system time clock (STC) and generates an output data with a first sampling rate. The demultiplexer receives a bit stream and extracts a packetized elementary stream (PES) from the bit stream. The demultiplexer writes the PES into the memory. The comparator obtains a presentation time stamp (PTS) from the PES and compares the PTS and the STC. The sampling rate converter has a converting factor, samples the PES in the memory, and generates the output data according to the PES. The sampling rate converter changes the converting factor according to the compared result of the comparator.

11 Claims, 2 Drawing Sheets

SYNCHRONIZATION DEVICES AND METHODS

BACKGROUND OF THE INVENTION

1. Field of the Invention

The invention relates to a synchronization device, and more particularly to a synchronization device for audio/video signals.

2. Description of the Related Art

In a digital broadcast application, audio/video synchronization is important. A transmission terminal transmits a bit stream to a receipt terminal. The bit stream comprises a packetized elementary stream (PES), a transport stream (TS), and a program stream (PS). A program clock reference (PCR) included in the TS is used for building the system time clock (STC) of the receipt terminal. A presentation time stamp (PTS), included in the PES, allows the receipt terminal to identify the play time of the PES. However, there may be a slight difference between the STC of the transmission terminal and the STC of the receipt terminal. Specifically, the STC difference increases as time required for the transmission to be completed increases. Thus, an output buffer of the receipt terminal operates at an overflow or under-run state.

In a general audio/video synchronization mechanism, the receipt terminal compares its own STC with a received PTS. The comparison and resulting difference allows the audio/video synchronization mechanism to determine whether the play time is running behind or ahead of schedule. When the play time is running behind schedule, the receipt terminal stops playing the audio/video. When the play time is running ahead of schedule, some data packets in the output buffer are dropped. However, due to the stoppage by the receipt terminal and dropping of data packets, noticeable breaks in images or sounds may be observed by users.

Thus, it is desired to provide a synchronization device and method for audio/video signals, wherein audio/video playing is not stopped or data packets are not dropped.

BRIEF SUMMARY OF THE INVENTION

An exemplary embodiment of a synchronization device comprises a memory, a demultiplexer, a comparator, and a sampling rate converter. The synchronization device has a system time clock (STC) and generates an output data with a first sampling rate. The demultiplexer receives a bit stream and extracts a packetized elementary stream (PES) from the bit stream. The demultiplexer writes the PES into the memory. The comparator obtains a presentation time stamp (PTS) from the PES and compares the PTS and the STC. The sampling rate converter has a converting factor, samples the PES in the memory, and generates the output data according to the PES. The sampling rate converter changes the converting factor according to the compared result of the comparator.

An exemplary embodiment of a synchronization method is used for a system with a system time clock (STC). The method comprises the steps of: receiving a bit stream; extracting a packetized elementary stream (PES) from the bit stream; writing the PES into a memory; sampling the PES in the memory by a first sampling rate; generating an output data with a second sampling rate; obtaining a presentation time stamp (PTS) from the PES; comparing the PTS and the STC; and changing a value of the first sampling rate according to the compared result.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
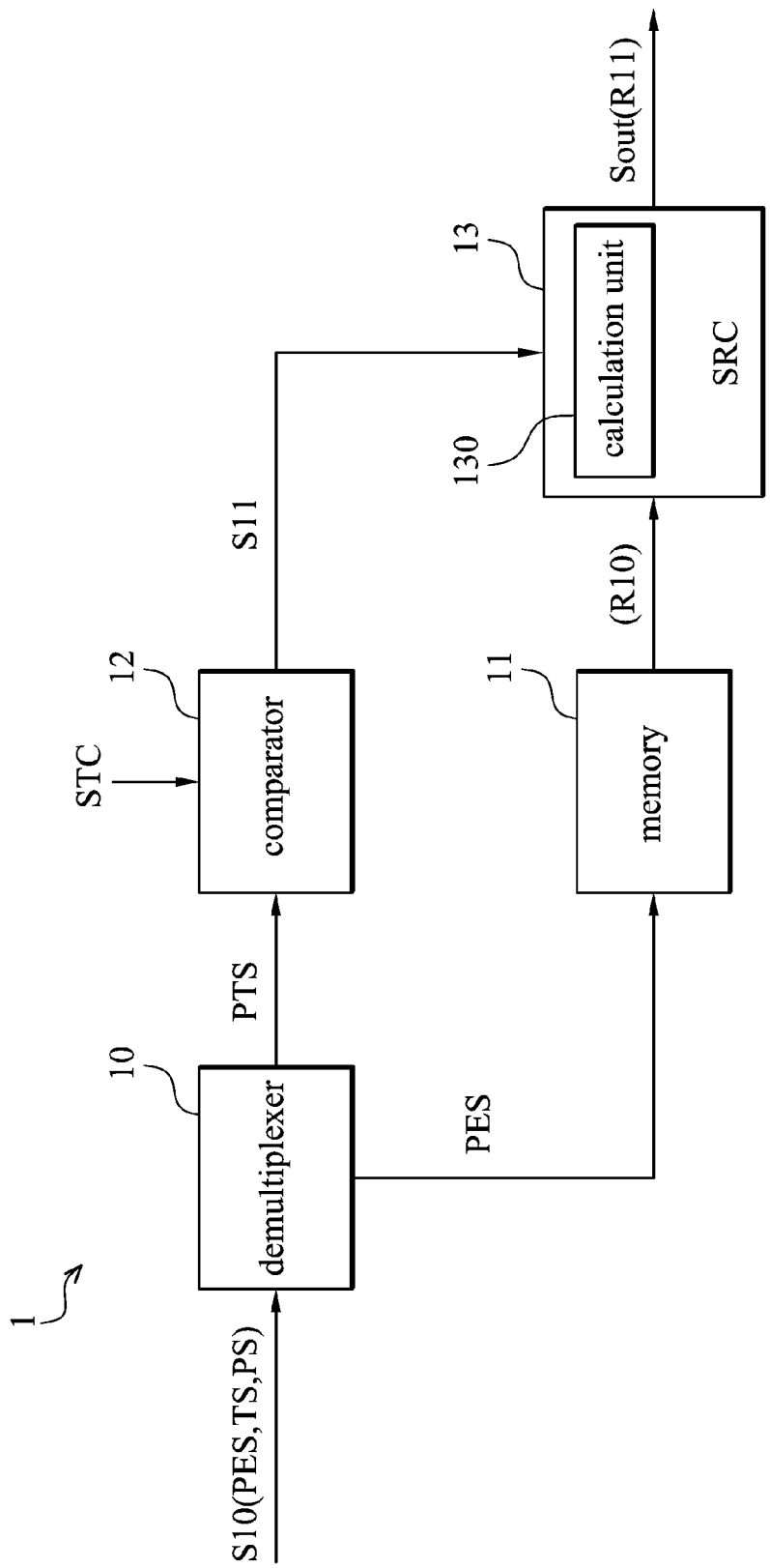
FIG. 1 is an exemplary embodiment of a synchronization device of the invention.

In an exemplary embodiment of a synchronization device of the invention in FIG. 1, a synchronization device 1 comprises a demultiplexer 10, a memory 11, a comparator 12, and a sampling rate converter (SRC) 13. The demultiplexer 10 receives a bit stream S10 from a transmission terminal (not shown in FIG. 1). The bit stream S10 comprises a packetized elementary stream (PES), a transport stream (TS), and a program stream (PS). A program clock reference (PCR) included in the TS is used for building the system time clock (STC) of the synchronization device 1. A presentation time stamp (PTS) included in the PES, allows the receipt terminal to identify the play time of the PES.

The demultiplexer 10 extracts the PES from the bit stream S10 and writes the PES into the memory 11. The comparator 12 obtains the PTS from the PES and compares the PTS and the STC of the synchronization device 1. The SRC 13 has a converting factor. The SRC 13 samples the PES in the memory 11 by a sampling rate R10 to generate a sampled data and generates an output data Sout by sampling the sampled data by the sampling rate R11. A converting factor of the SRC is defined as a ratio of the sampling rate R10 and the sampling rate R11. The SRC 13 changes the converting factor according to the compared result of the comparator 12.

Figure 2:
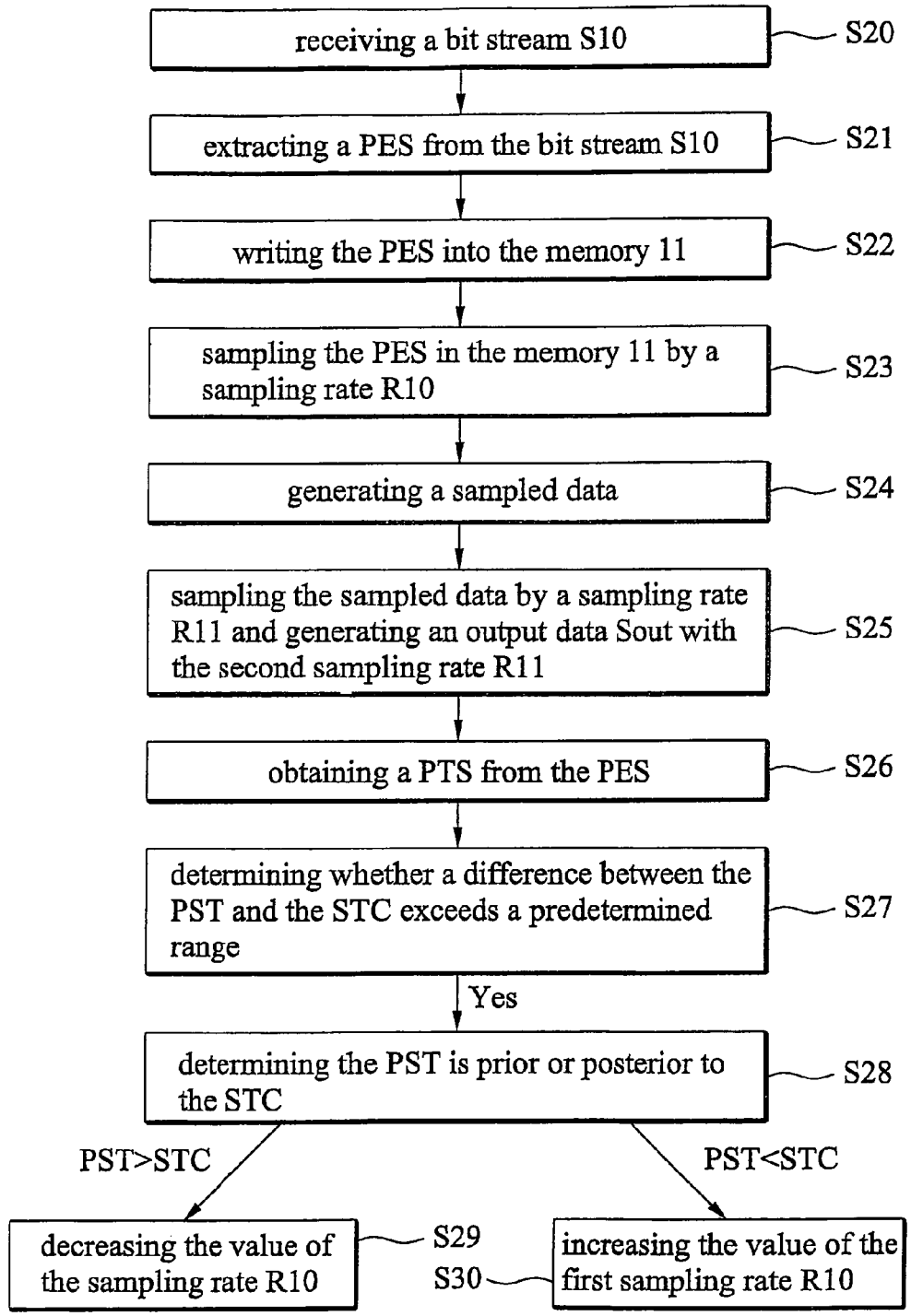
FIG. 2 is flow chart of an exemplary embodiment of a synchronization method of the invention.

Following, a detailed operation of the synchronization device 1 will be described. Referring to FIG. 1, the SRC 13 comprises a calculation unit 130, which defines a variation value. The comparator 12 determines whether a difference between the PTS and the STC exceeds a predetermined range by comparing the PTS and the STC. When the difference between the PTS and the STC exceeds the predetermined range, the comparator 12 outputs an indication signal S11. If the difference between the PTS and the STC exceeds the predetermined range and the PTS is prior to the STC, the SRC 13 decreases the converting factor according to the indication signal S11 by the variation value. In other words, a value of the sampling rate R10 is decreased for sampling the PES. If the difference between the PTS and the STC exceeds the predetermined range and the PST is posterior to the STC, the SRC 13 increases the converting factor according to the indication signal by the variation value. In other words, the value of the sampling rate R10 is increased for sampling the PES FIG. 2 is flow chart of an exemplary embodiment of a synchronization method of the invention. Referring to FIGS. 1 and 2, the synchronization device 1 has a STC. The demultiplexer 10 receives a bit stream S10 (Step S20) and extracts a PES from the bit stream S10 (Step S21). The demultiplexer 10 writes the PES into the memory 11 (Step S22). The SRC 13 samples the PES in the memory 11 by a sampling rate R10 (Step S23) and then generates a sampled data (Step S24). The SRC 13 samples the sampled data by a sampling rate R11 and generates an output data Sout with the second sampling rate R11 (Step S25). The comparator 12 obtains a PTS from the PES (Step S26) and determines whether a difference between the PTS and the STC exceeds a predetermined range (Step S27). When the comparator 12 determines that the difference between the PTS and the STC exceeds the predetermined range (Yes), the comparator 12 determines whether the PTS is prior or posterior to the STC (Step S28). If the comparator 12 determines that the PTS is prior to the STC, the SRC 13 decreases the value of the sampling rate R10 (Step S29). If the comparator 12 determines that the PTS is posterior to the STC, the SRC 13 increases the value of the sampling rate R10 (Step S30).

According to the synchronization device 1 and method of the embodiments, the sampling rate R10 for the PES is varied by the SRC 13 when the difference between the PTS and the STC exceeds a predetermined range, so that the memory 11 does not operate in an overflow or under-run state. Thus, the difference between the PTS and the STC is always operating within the predetermined range which is defined according to system requirements and does not affect synchronization. The synchronization device 1 of the invention does not stop playing audio/video and does not drop data packets, so that audio/video signals can be played continuously in the synchronization process.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronization device with a system time clock (STC) and generating an output data with a first sampling rate, comprising
    a memory;
    a demultiplexer receiving a bit stream and extracting a packetized elementary stream (PES) from the bit stream, wherein the demultiplexer writes the PES into the memory;
    a comparator obtaining a presentation time stamp (PTS) from the PES and comparing the PTS and the STC; and
    a sampling rate converter having a converting factor, sampling the PES in the memory according to the converting factor, and generating the output data according to the PES;
    wherein the sampling rate converter changes the converting factor according to the compared result of the comparator; and
    when a difference between the PTS and the STC exceeds a predetermined range, the comparator outputs an indication signal, and the sampling rate converter changes the converting factor according to the indication signal.

2. The synchronization device as claimed in claim 1, wherein when the PTS is prior to the STC, the sampling rate converter decreases the converting factor according to the indication signal.

3. The synchronization device as claimed in claim 1, wherein when the PTS is posterior to the STC, the sampling rate converter increases the converting factor according to the indication signal.

4. The synchronization device as claimed in claim 1, wherein the sampling rate converter samples the PES by a second sampling rate, and the converting factor is defined as a ratio of the second sampling rate and the first sampling rate.

5. The synchronization device as claimed in claim 4, wherein the sampling rate converter samples the PES by the second sampling rate to generate a sampled data and generates the output data by sampling the sampled data by the first sampling rate.

6. The synchronization device as claimed in claim 1, wherein the sampling rate converter comprises a calculation unit defining a variation value, and the sampling rate converter changes the converting factor by the variation value when the difference between the PTS and the STC exceeds the predetermined range.

7. A synchronization method for a device with a system time clock (STC) which generates an output data comprising:
    receiving a bit stream;
    extracting a packetized elementary stream (PES) from the bit stream;
    writing the PES into a memory;
    sampling the PES in the memory by a first sampling rate;
    obtaining a presentation time stamp (PTS) from the PES;
    comparing the PTS and the STC; and
    changing a value of the first sampling rate according to a compared result;
    wherein the step of comparing the PTS and the STC comprises determining whether a difference between the PTS and the STC exceeds a predetermined range; and
    wherein when the difference between the PTS and the STC exceeds the predetermined range, the value of the first sampling rate is changed.

8. The synchronization method as claimed in claim 7, wherein the step of comparing the PTS and the STC further comprises determining whether the PTS is prior or posterior to the STC when it is determined that the difference between the PTS and the STC exceeds the predetermined range.

9. The synchronization method as claimed in claim 8, wherein the step of comparing the PTS and the STC further comprises decreasing the value of the first sampling rate if it is determined that the PTS is prior to the STC.

10. The synchronization method as claimed in claim 8, wherein the step of comparing the PTS and the STC further comprises increasing the value of the first sampling rate if it is determined that the PTS is posterior to the STC.

11. The synchronization method as claimed in claim 7 further comprising:
    generating a sampled data after the step of sampling the PES in the memory by the first sampling rate, and
    sampling the sampled data by a second sampling rate to generate the output data, wherein the second sampling rate different from the first sampling rate.

* * * * *